Figure 1:
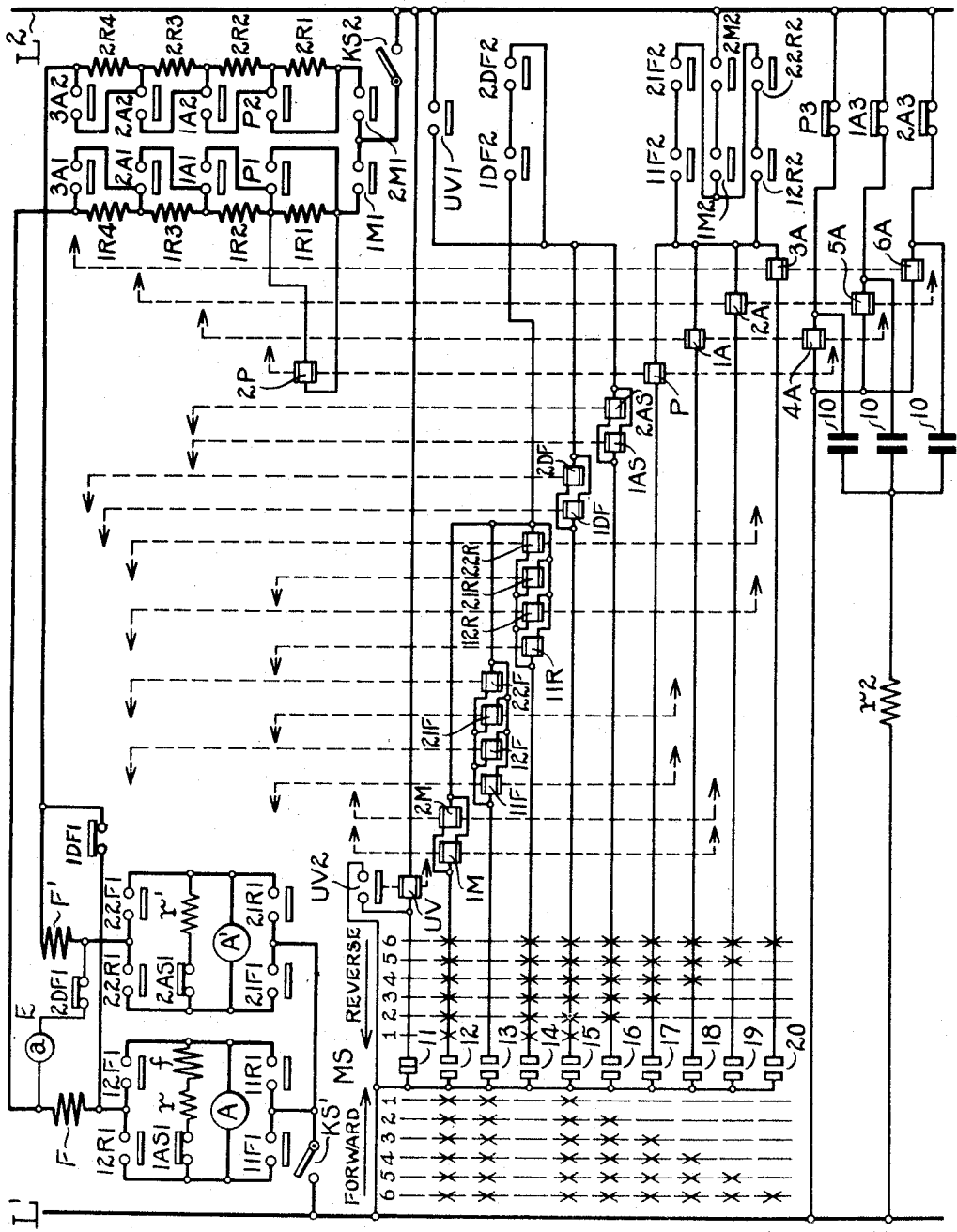

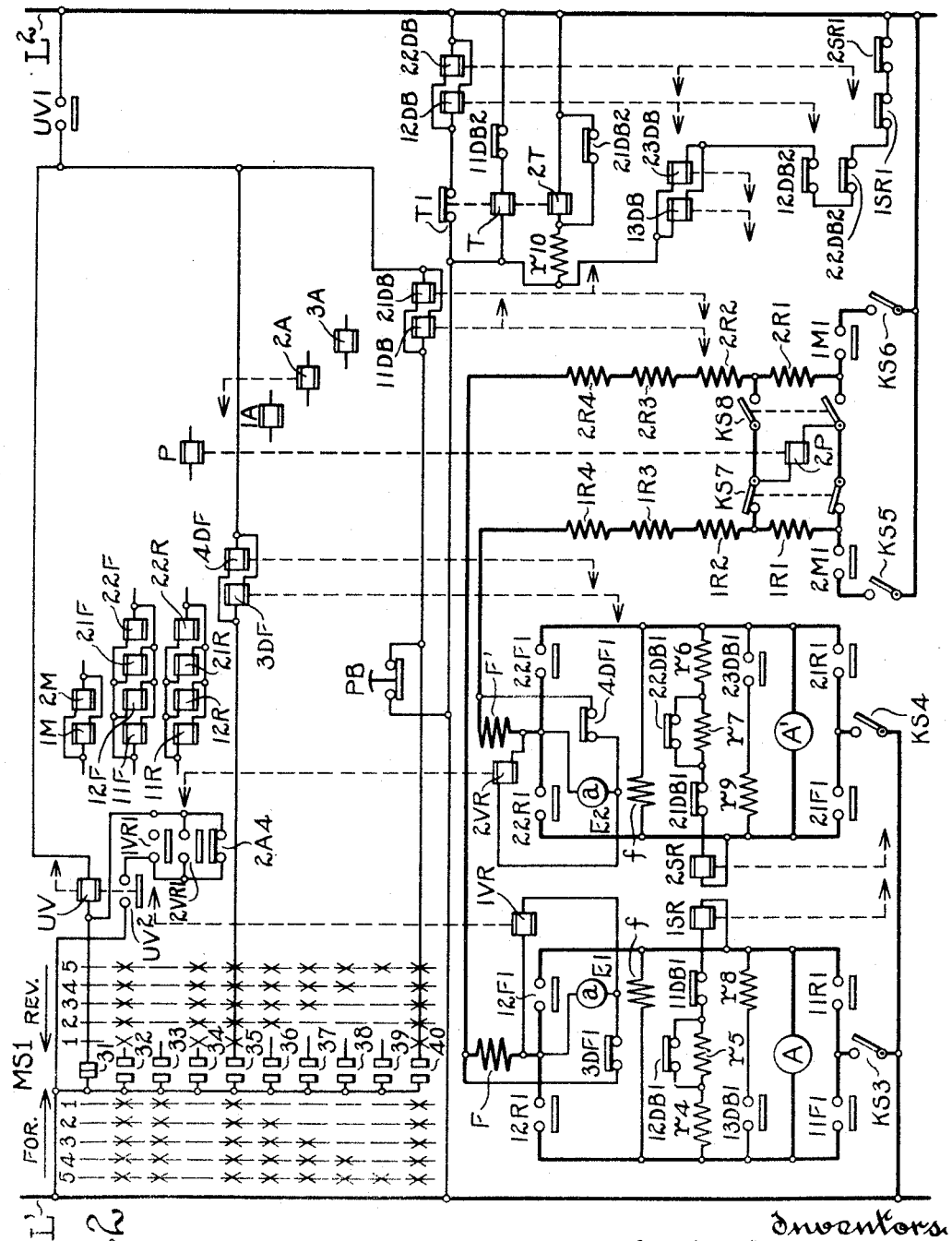

Patented Oct. 24, 1950

2,526,893

UNITED STATES PATENT OFFICE 2,526,893

DYNAMIC BRAKING CONTROL

John M. Newman and Edwin W. Seeger, Wauwatosa, Wis., assignors to Cutler-Hammer, Inc., Milwaukee, Wis., a corporation of Delaware Application August 28, 1946, Serial No. 693,497

17 Claims. (Cl. 318—57)

This invention relates to improvements in dynamic braking control for motors having series field windings.

In practice there are instances where it is desired to use one or a plurality of such motors as a drive, reversing such motor or motors for drive reversals and effecting dynamic braking regardless of direction of rotation of the motor or motors. One form of dynamic braking controller for a multimotor drive employing series wound motors is disclosed in the Wilson et al. Patent No. 1,985,706, December 25, 1934, and a further development thereof is disclosed in the Harwood Patent 2,172,245, September 5, 1939.

The present invention has among its objects to accomplish in a different way control comparable to that afforded by the means disclosed in the aforementioned patents and moreover in such a way as to afford certain advantages.

Another object is to provide control of the aforestated character which may be embodied in various different forms to meet different requirements; for example, as regards number of motors to be controlled, emergency exclusion of one or more motors, provision for optional drifting of the motors, etc.

Another object is to provide control avoiding need of the cross connection of the motor armatures and field windings which is characteristic of the aforementioned earlier form of control and which involves somewhat complicated control means.

Another object is to provide control affording if desired dynamic braking of a single series motor.

Other objects and advantages of the instant invention will hereinafter appear.

The accompanying drawing illustrates diagrammatically in an across-the-line manner certain embodiments of the invention which will now be described, it being understood that the embodiments illustrated are susceptible of various modifications without departing from the scope of the appended claims.

In the drawing,

Figure 1 illustrates a controller for a plurality of motors, which controller embodies the invention in a simple form in the sense that the control shown is in the main of conventional form, whereas the additions thereto are very simple; and Fig. 2 illustrates a controller embodying the invention in a more elaborate form.

Referring to Fig. 1, the same shows a two-motor drive wherein the motors are respectively provided with armatures A and A' and series field windings F and F'. These motors are provided with individualized sets of direction controlling switch contacts which provide for reversal of flow of armature current. Switch contacts 11R1, 12R1, 11F1, 12F1 constitute the direction controlling contacts for armature A, while switch contacts 21R1, 22R1, 21F1, 22F1 constitute the direction controlling contacts for armature A'. Also the motors are provided with individualized sets of series resistors, those for motor A—F comprising resistors 1R1, 1R2, 1R3, 1R4, and those for motor A'—F' comprising resistors 2R1, 2R2, 2R3, 2R4. Such resistors have individualized switch contacts for short-circuiting the same. Resistors 1R1 and 2R1 which constitute plugging resistors are respectively provided with short-circuiting switch contacts P1 and P2. Resistors 1R2 and 2R2 are respectively provided with short-circuiting switch contacts 1A1 and 1A2, while resistors 1R3 and 2R3 are respectively provided with short-circuiting switch contacts 2A1 and 2A2, and resistors 1R4 and 2R4 are respectively provided with short-circuiting switch contacts 3A1 and 3A2. The motors are supplied with current from lines L' and L2 through knife switches KS' and KS2 and through main switch contacts individualized to the two motors. Main switch contacts 1M1 controlling motor A—F and main switch contacts 2M1 controlling motor A'—F' are interposed between the resistors aforementioned and knife switch KS2. All aforementioned switch contacts are of the normally disengaged type.

All aforementioned switch contacts except the resistor controlling contacts are provided with individualized electromagnetic operating windings, the relationship of contacts and windings being indicated by broken lead lines and arrows. Thus main switch contacts 1M1 and 2M1 are respectively provided with operating windings 1M and 2M which may be readily located on the drawing by following the broken lead lines from the arrows aligned horizontally with said contacts. Switch contacts 11F1, 12F1, 21F1 and 22F1 are respectively provided with individualized windings 11F, 12F, 21F and 22F which likewise may be easily located through the broken lead lines and arrows associated with said windings. Contacts 11R1, 12R1, 21R1 and 22R1 are respectively provided with operating windings 11R, 12R, 21R and 22R. While the aforementioned resistor controlling contacts may be provided with individualized operating windings the corresponding contacts of the two groups are shown as provided with a single operating winding. Thus contacts P' and P2 are provided with a winding P common thereto, whereas windings 1A, 2A and 3A are provided for operating the remaining resistor controlling contacts in pairs.

The additions to the aforedescribed conventional control means comprise an exciter E having armature $a$, and a field winding $f$ included in a dynamic braking connection for motor armature A. More particularly, exciter field winding $f$ is connected across motor armature A by switch contacts 1AS1 through a resistor $r$. The exciter armature $a$ is adapted to be connected by switch contacts 1DF1 and 2DF1 in a closed loop including the motor field windings F and F' in a series relation and in a relation to the exciter armature such that the current delivered by the exciter traverses each motor field winding in the same direction that current traverses it during power operation of the motor in either direction. Thus assuming the exciter to be suitably driven as by the machine driven by the two motors, the arrangement illustrated provides for energization of the exciter field winding by the dynamic braking current delivered by motor armature A and said exciter delivers current to both motor field windings F and F' for continued dynamic braking. Here it will be noted that motor armature A' has a dynamic braking circuit inclusive of a resistance $r'$, which circuit is adapted to be closed by switch contacts 2AS1. Contacts 1DF1 and 2DF1, 1AS1 and 2AS1 are provided with individualized electromagnetic operating windings 1DF, 2DF, 1AS and 2AS.

While in Fig. 1 the exciter field winding is of the series type, the exciter field may be of the shunt winding type or a combination of series and shunt type windings. For small horsepower motors the series field is satisfactory but for large horsepower motors it probably becomes simpler to wind the exciter field for shunt connection as in Fig. 2 instead of series connection.

With the control illustrated in Fig. 1 the connections controlled by switch contacts 1AS1 and 2AS1 may be utilized not only for dynamic braking but also as armature shunts for the two motors whereby they may be operated under power with a greater current through the series field windings for more stable slow speed under varying load conditions. As will later appear, the control illustrated is such that the contacts 1AS1 and contacts 2AS1 when disengaged for power operation of the motors may be reengaged while power is supplied and while switch contacts 1DF1, 2DF1 are still disengaged. Then when power is cut off the dynamic braking connections for the motor armatures are already completed and contacts 1DF1 and 2DF1 are caused to reengage to effect excitation of the motor field windings by the exciter, as heretofore explained.

Also the control illustrated in Fig. 1 provides for disconnection of the motors from the supply circuit and for dynamic braking upon failure of voltage. As will hereinafter appear, voltage failure results in drop-out of a relay UV and this effects release and reengagement of contacts 1AS1, 2AS1, 1DF1 and 2DF1 in addition to release of the power controlling switches.

Except in the respects aforenoted the control shown in Fig. 1 is of a conventional plugging type wherein the plugging switch operated by winding P has a restraining winding 2P connected across resistor 1R1, while the resistor switches operable by windings 1A, 2A and 3A are respectively provided with restraining windings 4A, 5A and 6A. The restraining windings 4A, 5A and 6A are connected across supply lines L', L2 through contacts P3, 1A3 and 2A3, respectively, which are auxiliary contacts of the plugging switch and the first two accelerating switches, respectively. Also these restraining windings 4A, 5A and 6A are provided with individual shunts each containing a condenser 10, these shunts extending to line L' through a common resistor $r2$ and functioning to delay the deenergization of their respective windings in a well known manner. Also the control of Fig. 1 comprises a low voltage relay having contacts UV1 which are normally disengaged and which are engageable by an electromagnetic winding UV under the control of master switch MS.

The master switch MS which may be of any preferred form is shown as comprising contacts 11 engaged in the off position of said master switch and contacts 12, 13, 14, 15, 16, 17, 18, 19 and 20, all of which are disengaged in the off position. Contacts 11 when engaged connect winding UV across lines L', L2 and said winding upon responding engages contacts UV1 and also auxiliary contacts UV2. Contacts UV2 complete a maintaining circuit for winding UV shunting master switch contacts 11, the latter contacts being disengaged in all positions of the master switch other than off position. Master switch MS is shown as having six positions for forward operation of the motors and a like number of positions for reverse operation of the motors, and contacts 12 to 20 are adapted to be engaged in all positions indicated by crosses, whereas they remain open in all other positions of the master switch. Thus contacts 12 are closed in all running positions to connect main switch windings 1M and 2M in parallel across lines L', L2 through normally disengaged contacts 1DF2 and 2DF2 and normally disengaged contacts UV1. Accordingly the main switches are responsive only if the low voltage relay is closed, and only if the windings 1DF and 2DF have responded to engage contacts 1DF2 and 2DF2 and to disengage contacts 1DF1 and 2DF1 to insure against cross connection of the motor fields. Incidentally, master switch contacts 15 are also engaged in all running positions of the master switch and when engaged connect windings 1DF and 2DF in parallel across lines L', L2 through the voltage relay contacts UV1. Master switch contacts 13 are closed in all forward positions of the master switch and when engaged connect direction switch windings 11F, 12F, 21F, 22F across lines L', L2 in parallel with one another and with main switch windings 1M and 2M. Master switch contacts 14 are closed in all reverse operating positions and when engaged connect direction switch windings 11R, 12R, 21R and 22R in parallel with one another and with main switch windings 1M and 2M. Master switch contacts 16 are engaged in all operative positions of the master switch except the first forward and first reverse positions and when engaged connect windings 1AS and 2AS in parallel across lines L', L2 through the voltage relay contacts UV1. Master switch contacts 17 are engaged in all operative positions of the master switch except the first and second forward and reverse positions and when engaged connect winding P across lines L' and L2 through contacts 11F2, 21F2 of the forward direction switches, or alternatively through contacts 12R2 and 22R2 of the reverse direction switches, and thence through contacts 1M2 and 2M2 of the main switches. Contacts 18 of the master switch are engaged in forward and reverse positions 4, 5 and 6 and when engaged connect winding 1A in parallel with winding P. Contacts 19 of the master switch are engaged in the forward and reverse positions 5 and 6 and when engaged connect winding 2A in parallel with windings P and 1A. Contacts 20 of the master switch are engaged only in forward and reverse position 6 and when engaged connect winding 3A in parallel with windings P, 1A and 2A.

Referring to Fig. 2, the two motors shown therein are like those of Fig. 1 and are designated by the reference characters used in Fig. 1. This is also true of the motor series resistors and their control switches, and is also true of the motor direction controlling switches and main switches. For simplicity of illustration the contacts of the resistor controlling switches are omitted in Fig. 2, as are also the restraining windings of the resistor controlling switches other than that of the plugging switch. Also for simplicity of illustration the control circuits for the direction controlling switches, the main switches and the resistor controlling switches other than the circuit of the restraining winding of the plugging switch are omitted in Fig. 2. It is to be understood that the aforementioned parts and circuits omitted in Fig. 2 may be and preferably are as illustrated in Fig. 1.

The differences between the systems of Figs. 1 and 2 include those now to be described. In Fig. 2 separate exciters E1 and E2 are provided for exciting the motor series field windings F and F', respectively, for dynamic braking. Field winding F is adapted to be connected across the armature $a$ of exciter E1 by normally engaged switch contacts 3DF1 and field winding F' is adapted to be connected across the armature $a$ of exciter E2 by normally engaged switch contacts 4DF1. Field winding $f$ of exciter E1 is permanently connected across the terminals of motor armature A while field winding $f$ of exciter E2 is permanently connected across the terminals of motor armature A'. Thus assuming the exciters to be driven by their respective motors or in any other suitable manner, provision is made for excitation of the motor series field windings F and F' for dynamic braking, with current flow through said motor field windings unaffected by the direction of power operation of the motors prior to dynamic braking. The provision of individualized exciters has among its advantages simplification of provision for emergency disconnection of either motor, leaving intact the control, inclusive of dynamic braking control, of the other motor. Also such connection of the exciter field windings has advantages including that of providing for excitation of both windings without establishment of dynamic braking connections, and as will later appear this is very advantageous in connection with the drift control provisions of the system illustrated. Moreover such shunt connection of the exciter fields simplifies winding thereof to obtain the action of the exciters which is to be predetermined.

In the system of Fig. 2 dynamic braking connections for motor armatures A and A' are established by switch contacts 11DB1 and 21DB1, said switch contacts being of the normally engaged type. Such dynamic braking connections for motor armature A include resistors r4 and r5 and a relay coil 1SR, all in series, and these connections also include normally engaged switch contacts 12DB1 for short-circuiting resistor r5. Thereby provision is made for one step of graduation of dynamic braking while an additional step is provided by engagement of normally disengaged switch contacts 13DB1 which connect a resistor r8 in parallel with the aforementioned dynamic braking connections. The corresponding dynamic braking connections for motor armature A' include resistors r6 and r7 and a relay coil 2SR, normally engaged contacts 22DB1 being provided to short-circuit resistor r7. Also these dynamic braking connections include a parallel circuit through a resistor r9 and normally disengaged switch contacts 23DB1. As will be later described in further detail, following initial completion of dynamic braking connections by engagement of switch contacts 11DB1 and 21DB1, contacts 12DB1 and 22DB1 engage to short-circuit their respective resistors upon expiration of a definite time interval, whereas switch contacts 13DB1 and 23DB1 thereafter engage subject to control by contacts under the control of relay coils 1SR and 2SR.

Considering further differences between systems of Fig. 2 and Fig. 1, the system of Fig. 2 has knife switches KS3 and KS4 individualized to the two motors for control of connections to line L', and knife switches KS5 and KS6 individualized to the two motors to control connections to line L2. Thus either motor may be disconnected for emergency use of the other motor alone and without impairing the dynamic braking action of the motor employed alone. As in the system of Fig. 1, the plugging switch operable by winding P has a holdout or restraining winding to be connected across one of the series resistors. Such restraining winding is in Fig. 2 designated as 2P and has associated therewith two double pole knife switches KS7 and KS8 to connect the same across resistor 1R1, or alternatively across resistor 2R1. When both motors are in service the winding 2P may be connected across either of said resistors to function as in the system of Fig. 1, whereas when one motor is disconnected for emergency use of the other alone, said winding should be connected across the resistor associated with the latter motor. Thus plugging control as well as dynamic braking control is preserved for the remaining motor when either is disconnected in emergencies.

An additional feature of the system of Fig. 2 includes voltages coils 1VR and 2VR which are permanently connected across the armatures of exciters E1 and E2, respectively, these coils respectively controlling normally disengaged contacts 1VR1 and 2VR1 which with normally engaged contacts of one of the accelerating switches are connected in parallel in the maintaining circuit of the low voltage relay UV. As shown the normally engaged contacts are contacts of the resistor switch operated by winding 2A but they might be contacts of another resistor switch, as for example that operated by winding 3A. The purpose of this coordination of contacts 1VR1, 2VR1 and 2A4 is to effect tripping of the low voltage relay unless one or both of the exciters develops a predetermined voltage during the accelerating period, thereby to guard against high speed operation without preparedness for dynamic braking.

Another additional feature is provision for drift of the motors in off position of the master switch subject to establishment of dynamic braking connections at will. Such provisions involve use of a master switch MS1 which is a slight modification of the master switch shown in Fig. 1 and addition of a push button switch PB which may if desired be of the foot operated type.

The master switch MS1 like the master switch of Fig. 1 has contacts 31 engaged in the off position to energize winding UV, said contacts being opened in all other positions of the master switch. Also like the master switch of Fig. 1, master switch MS1 has contacts 32, 33, 34, 36, 37, 38 and 39 which are disengaged in the off position and which respectively control the operating windings of the main switches, the forward direction switches, the reverse direction switches, the plugging switch and the three resistor switches, it being assumed that the circuits not shown are the same as those shown in Fig. 1. In this instance the master switch has only five forward positions and five reverse positions, contacts 32 being engaged in all except the off position, contacts 33 being engaged in all forward positions, contacts 34 being engaged in all reverse positions, contacts 36 being engaged in all positions except the first forward and reverse positions, contacts 37 being engaged in the third, fourth and fifth forward and reverse positions, contacts 38 being engaged in the fourth and fifth forward and reverse positions, and contacts 39 being engaged only in the fifth forward and reverse positions. In addition to the aforementioned contacts the master switch has contacts 35 and 40 which are disengaged in the off position and engaged in all forward and reverse positions. Contacts 35 when engaged complete circuit for windings 3DF and 4DF, which as indicated by broken lines and arrows operate switch contacts 3DF1 and 4DF1, for disengagement thereof in all positions of the master switch except off position. As will be apparent, windings 3DF and 4DF are connected by the master switch in parallel across lines L', L2 through contacts UV1 which are engaged by energization of winding UV. Contacts 40 of the master switch when engaged similarly connect across lines L', L2 in a parallel relation windings 11DB and 21DB, which as indicated by broken lines and arrows are provided to operate contacts 11DB1 and 21DB1, to interrupt the dynamic braking connections for motor armatures A and A' except in the off position of the master switch. On the other hand, normally closed push button switch PB shunts the master switch contacts 40 to provide for energization of windings 11DB and 21DB even in the off position of master switch but subject to deenergization at will when the master switch is in off position, by operation of switch PB.

Independent of the master switch except indirectly are windings 12DB and 22DB, which as will be apparent are connected in parallel across lines L', L2 through normally engaged contacts T1. These latter windings, as indicated by broken lines and arrows, control contacts 12DB1 and 22DB1, and said windings being connected across lines L', L2 as described provide for disengagement of said contacts except when contacts T1 are disengaged. Contacts T1 have for disengaging the same an operating winding T having in circuit therewith normally engaged contacts 11DB2 operable by winding 11DB. Thus as winding 11DB is energized in all forward and reverse positions of the master switch, the winding T is responsive to disengage contacts T1 for deenergization of windings 12DB and 22DB only when winding 11DB is deenergized by placing the master switch in off position and by operating switch PB. As will be apparent, when contacts 11DB2 engage they connect winding T directly across lines L' and L2, but disengagement of contacts T1 is delayed by a holding or restraining winding 2T. Winding 2T has a permanent connection across lines L', L2 through a resistor r10, whereas it has a short-circuit completed by normally engaged contacts 21DB2 disengageable by response of winding 21DB. As heretofore indicated, the control of winding 21DB is the same as that of winding 11DB, and thus the contacts 21DB2 are disengaged except when the master switch is in off position and switch PB is open. Upon closure of contacts 21DB2 winding 2T is deenergized subject to a time element which is a function of its self-induction, and thereupon winding T is permitted to disengage contacts T1.

Also independent of the master switch except indirectly are windings 13DB and 23DB which as indicated by broken lines and arrows control the normally disengaged contacts 13DB1 and 23DB1. These windings, as will be apparent, are connected across lines L', L2 through normally engaged contacts 12DB2, 22DB2, 1SR1 and 2SR1. Contacts 12DB2 and 22DB2, as indicated by broken lines and arrows, are operable by windings 12DB and 22DB for disengagement, and thus provision is made for insuring against commutation of the dynamic braking connections by contacts 13DB1 and 23DB1 until after commutation of said connections by contacts 12DB1 and 22DB1. Moreover since windings 13DB and 23DB also have in the circuit thereof contacts 1SR1 and 2SR1 disengageable by the windings 1SR1 and 2SR1 it will be apparent that windings 13DB and 23DB cannot respond until the dynamic braking current decreases to a value at which the windings 1SR and 2SR release the contacts 1SR1 and 2SR1.

From the foregoing description power operation of the motors and graduated dynamic braking action of the motors will be apparent, and in this connection it will be noted that the master switch when returned to off position deenergizes windings 3DF and 4DF to connect the motor field windings across the armatures of their respective exciters whether or not dynamic braking connections for the motors are completed through operation of switch PB. Also it will be noted that during acceleration of the motors the maintaining circuit for the low voltage relay through its contacts UV2 will be interrupted by the contacts 2A4 unless meanwhile the contacts 1VR1 or 2VR1 have engaged. Thus as engagement of contacts 1VR1 and 2VR1 is dependent upon generation of given voltage by the exciters operation of the motors will be stopped after partial acceleration if for any reason the exciters fail to build up voltage in preparation for dynamic braking.

Assuming master switch MS1 to be returned to off position without opening of switch PB, the motors will be disconnected from circuit without establishment of dynamic braking connections whereby drifting of the motors is obtainable subject to stopping at will by opening switch PB for dynamic braking. During such drifting the motor field windings receive no current from the line but they are connected across the armatures of their respective exciters and the field windings of said exciters being connected across the motor armatures are kept energized sufficiently for preparedness for dynamic braking.

It is, of course, to be understood that reference herein to motors having series field windings does not exclude motors having compound fields and that compound fields may be provided for the exciters if desired, suitable connections for series and shunt type exciter windings being herein disclosed.

What we claim as new and desire to secure by Letters Patent is:

1. In combination, a motor having a series field winding, a power circuit, means to connect said motor to said circuit and to control the direction of current flow through the motor armature for reverse operations of said motor, and means providing for dynamic braking by said motor when rotating without power from said circuit and regardless of direction of rotation, the last recited means comprising a suitably driven exciter having a source of exciting current other than said power circuit, and further comprising switch means which disconnects said motor field winding from said motor armature and connects the former across the armature of said exciter and which also establishes dynamic braking connections for said motor armature.

2. In combination, a multi motor drive, each motor having a series of field winding, a power circuit, means to connect said motors to said circuit and to effect forward or reverse operation of said motors through armature current reversals, and means providing for dynamic braking by said motors when rotating without power from said circuit and regardless of direction of rotation, the last recited means comprising suitably driven means of the exciter type having a source of exciting current other than said power circuit, and further comprising switch means which disconnect said motor field windings from their respective motor armatures and connect said motor field windings to said exciter means and which also establish dynamic braking connections for said motor armatures.

3. In combination, a motor having a series field winding, a power circuit, means to connect said motor to said circuit and to control the direction of current flow through the motor armature for reverse operations of said motor, and means providing for dynamic braking by said motor when rotating without power from said circuit and regardless of direction of rotation, the last recited means comprising a suitably driven exciter having a field winding supplied with current generated by said motor and further comprising switch means which disconnects said motor field winding from said motor armature and connects said motor field winding across the armature of said exciter and which also establishes dynamic braking connections for the armature of said motor.

4. In combination, a multi motor drive, each motor having a series field winding, a power circuit, means to connect said motors to said circuit and to effect forward or reverse operation of said motors through armature current reversals, and means providing for dynamic braking by said motors when rotating without power from said circuit and regardless of direction of rotation, the last recited means comprising suitably driven means of the exciter type deriving field excitation from current generated by said multi motor drive and further comprising switch means which disconnect said motor field windings from their respective motor armatures and connect said motor field windings to said exciter means and which also establish dynamic braking connections for said motor armatures.

5. In combination, a multi motor drive, each motor having a series field winding, a power circuit, means to connect said motors to said circuit and to effect forward or reverse operation of said motors through armature current reversals, and means providing for dynamic braking by said motors when rotating without power from said circuit and regardless of direction of rotation, the last recited means comprising a suitably driven exciter having a field winding supplied with current generated by said multi motor drive and further comprising switch means to connect a plurality of said motor field windings across the armature of said exciter and to establish dynamic braking connections for the armatures of said motors.

6. In combination, a multi motor drive, each motor having a series field winding, a power circuit, means to connect said motors to said circuit and to effect forward or reverse operation of said motors through armature current reversals, and means providing for dynamic braking of said motors when rotating without power from said circuit and regardless of direction of rotation, the last recited means comprising suitably driven exciters individualized to said motors and each deriving field excitation from current generated by its respective motor, and further comprising switch means to connect said motor field windings to their respective exciters and to establish dynamic braking connections for the armatures of said motors.

7. In combination, a motor having a series field winding, a power circuit, means to connect said motor to said circuit and to control the direction of flow of current through the motor armature for reverse operations of said motor, and means providing for dynamic braking by said motor when rotating without power from said circuit and regardless of the direction of rotation, the last recited means comprising a suitably driven exciter having a field winding of the series type and further comprising switch means to establish dynamic braking connections for the armature of said motor including said exciter field winding and to connect said motor field winding across the armature of said exciter but first disconnecting said motor field winding from said motor armature.

8. In combination, a motor having a series field winding, a power circuit, means to connect said motor to said circuit and to control the direction of current flow through the motor armature for reverse operations of said motor, and means providing for dynamic braking by said motor when rotating without power from said circuit and regardless of direction of rotation, the last recited means comprising a suitably driven exciter having a field winding of the shunt type connected across the terminals of the armature of said motor and further comprising switch means to establish dynamic braking connections for the armature of said motor and to connect said motor field winding across the armature of said exciter but first disconnecting said motor field winding from said motor armature.

9. In combination, a multi motor drive, each motor having a series field winding, a power circuit, means to connect said motors to said circuit and to effect forward or reverse operation of said motors through armature current reversals, said means affording emergency disconnection of one of said motors without affecting operation of the others under the control of said means, and means providing for dynamic braking by said motors when rotating without power from said circuit and regardless of direction of rotation or number of motors, the last recited means comprising suitably driven means of the exciter type having a source of exciting current other than said power circuit, and further comprising switch means to connect said motor field windings to said exciter means and to establish dynamic braking connections for the armatures of said motors.

10. In combination, a multi motor drive, each motor having a series field winding, a power circuit, means to connect said motors to said circuit and to effect forward or reverse operation of said motors through armature current reversals, said means affording emergency disconnection of one of said motors without affecting operation of the others under the control of said means, and means providing for dynamic braking by said motors when rotating without power from said circuit and regardless of direction of rotation or number of motors, the last recited means comprising exciters individualized to said motors for drive thereby and for field excitation from current generated by their respective motors, and further comprising means to connect each of said motor field windings to its respective exciter and to establish dynamic braking connections for the armatures of said motors.

11. In combination, a motor having a series field winding, a power circuit, means to connect said motor to said circuit, said means affording reversals of current flow through the armature of said motor for reverse operations of said motor and for plugging of said motor and comprising a plugging resistor and a control switch therefor sensitive to the counter voltage of said motor, and means providing for dynamic braking by said motor when rotating without power from said circuit and regardless of direction of rotation, the last recited means comprising a suitably driven exciter having a source of exciting current other than said power circuit, and further comprising switch means to connect said motor field winding across the armature of said exciter and to establish dynamic braking connections for the armature of said motor.

12. In combination, a motor having a series field winding, a power circuit, means to connect said motor to said circuit, said means affording reversals of current flow through the armature of said motor for reverse operations of said motor and for plugging of said motor and comprising a plugging resistor and a control switch therefor sensitive to the counter voltage of said motor, and means providing for dynamic braking by said motor when rotating without power from said circuit and regardless of direction of rotation, the last recited means comprising a suitably driven exciter having a field winding supplied with current generated by said motor and further comprising switch means to connect said motor field winding across the armature of said exciter and to establish dynamic braking connections for the armature of said motor.

13. In combination, a motor having a series field winding, a power circuit, reversing control means for said motor affording connection of said motor to said circuit for power operation in opposite directions selectively, and means providing for dynamic braking by said motor when rotating without power from said circuit and regardless of direction of rotation, the second mentioned means comprising a suitably driven exciter having a source of exciting current other than said power circuit, and further comprising switch means to connect said motor field winding across the armature of said exciter and to establish dynamic braking connections for the armature of said motor, the first and second mentioned means providing for optional delayed establishment of dynamic braking connections following disconnection of said motor from circuit but meanwhile subjecting said motor field winding to current generated by said exciter.

14. In combination, a motor having a series field winding, a power circuit, reversing control means for said motor affording connection of said motor to said circuit for power operation in opposite directions selectively, and means providing for dynamic braking by said motor when rotating without power from said circuit and regardless of direction of rotation, the second mentioned means comprising a suitably driven exciter having a field winding of the shunt type connected across the armature terminals of said motor, and further comprising switch means to connect said motor field winding across the armature of said exciter and to establish dynamic braking connections for the armature of said motor, the first and second mentioned means providing for optional delayed establishment of dynamic braking connections following disconnection of said motor from circuit but meanwhile subjecting said motor field winding to current generated by said exciter.

15. In combination, a motor having a series field winding, a power circuit, reversing control means for said motor affording connection of said motor to said circuit for power operation in opposite directions selectively and also affording acceleration of said motor, said means including a low voltage relay which when released causes said means to disconnect said motor from circuit and which said means tends to release upon partial acceleration of said motor, an electroresponsive relay to be energized to complete a maintaining circuit for said low voltage relay, a suitably driven exciter having a field winding of the shunt type connected across the armature terminals of said motor, said electroresponsive relay having an operating winding connected across the armature terminals of said exciter, and switch means which for dynamic braking action of said motor when disconnected from said circuit connects said motor field winding across the armature of said exciter and establishes dynamic braking connections for the armature of said motor.

16. In combination, a motor having a series field winding, a power circuit, reversing control means for said motor affording connection of said motor to said circuit for power operation in opposite directions selectively and also affording acceleration of said motor, said means including a low voltage relay which when released causes said means to disconnect said motor from circuit and which said means tends to release upon partial acceleration of said motor, an electroresponsive relay to be energized to complete a maintaining circuit for said low voltage relay, a suitably driven exciter having a field winding of the shunt type connected across the armature terminals of said motor, said electroresponsive relay having an operating winding connected across the armature terminals of said exciter, and switch means which for dynamic braking action of said motor when disconnected from said circuit, connects said motor field winding across the armature of said exciter and establishes dynamic braking connections for the armature of said motor, the first mentioned means and said switch means providing for optional delayed establishment of dynamic braking connections following disconnection of said motor from circuit but meanwhile subjecting said motor field to the current generated by said exciter.

17. In combination, a motor having a series field winding, a power circuit, means including a master switch to connect said motor to said circuit for power operation and to effect acceleration and deceleration of said motor, and means providing for dynamic braking of said motor when said master switch is in off position to effect disconnection of said motor from said power circuit, the last recited means comprising an exciter having a field winding to be subjected to the dynamic braking current of said motor, and further comprising means to establish for said motor an armature shunt including said exciter field winding and to connect said motor field winding across the armature of said exciter, such motor field connection being made only in the off position of said master switch but said armature shunt being established prior to interruption of power connections by said master switch and being maintained in the off position of said master switch.

JOHN M. NEWMAN.
EDWIN W. SEEGER.

REFERENCES CITED

The following references are of record in the file of this patent:

UNITED STATES PATENTS

| Number | Name | Date |
|---|---|---|
| 1,191,602 | Lang | July 18, 1916 |
| 2,310,141 | Willby | Feb. 2, 1943 |

FOREIGN PATENTS

| Number | Country | Date |
|---|---|---|
| 766,539 | France | Apr. 16, 1934 |